United States Patent [19]

Bradt

[11] Patent Number: 5,747,548
[45] Date of Patent: May 5, 1998

[54] COMPARTMENTED THERMOPLASTIC PELLETS

[75] Inventor: Rexford H. Bradt, Warsaw, Ind.

[73] Assignee: Materials Research Innovations Corporation, Warsaw, Ind.

[21] Appl. No.: 819,573

[22] Filed: Mar. 14, 1997

Related U.S. Application Data

[62] Division of Ser. No. 406,582, Mar. 20, 1995, Pat. No. 5,627,218.

[51] Int. Cl.$^6$ .................. C08J 9/232; C08J 9/24
[52] U.S. Cl. .................. 521/57; 521/60; 521/76; 521/79; 525/11; 525/30; 525/168; 528/129; 528/137
[58] Field of Search ............... 521/57, 79, 60, 521/76; 525/11, 30, 168; 528/129, 137

[56] References Cited

U.S. PATENT DOCUMENTS

| | | | |
|---|---|---|---|
| Re. 26,278 | 10/1967 | Pottenger | 521/60 |
| 5,009,809 | 4/1991 | Kosin et al. | 521/76 |
| 5,009,810 | 4/1991 | Wason et al. | 521/76 |
| 5,037,580 | 8/1991 | Garcia et al. | 521/76 |
| 5,045,570 | 9/1991 | Mooney et al. | 521/76 |
| 5,106,534 | 4/1992 | Wason et al. | 521/76 |
| 5,252,618 | 10/1993 | Garcia et al. | 521/76 |
| 5,302,624 | 4/1994 | Reedy et al. | 521/76 |
| 5,342,857 | 8/1994 | Reedy et al. | 521/76 |

*Primary Examiner*—James J. Seidleck
*Attorney, Agent, or Firm*—Roger M. Rickert

[57] ABSTRACT

Apparatus and method for the production of hopper feedable thermoplastic pellets having zones or compartments which contain physically separated reactants which react only after being melt-mixed, as in a screw type extruder, reciproscrew injection machine, or similar device which heat forms pellets into a larger mass. This new class of thermoplastic molding materials relies mainly on the relatively slow reaction kinetics of contained large molecule molding materials to provide a time interval after melt-mixing of zoned pelletized reactants in an extruder barrel or injection molding machine. During this time period, the thermoplastic molding material is easily filled into injection molds. As the reaction progresses, the material becomes more viscous and such flow is difficult or impossible. The involved reactions may continue after demolding at room temperature during a post molding cure, or appliance service generated heat may cause post molding cure. Where a delayed reaction involves crosslinking and/or additional polymer molecular growth after molding, such crosslinking can bond adjacent molecules and reduce or prevent stress memory warpage of molded parts. Fibrous reinforcements may be included to aid in reducing post molding warpage. Foaming agents contained can, when molded by the Bradt Process, virtually eliminate weld lines in molded parts.

10 Claims, 2 Drawing Sheets

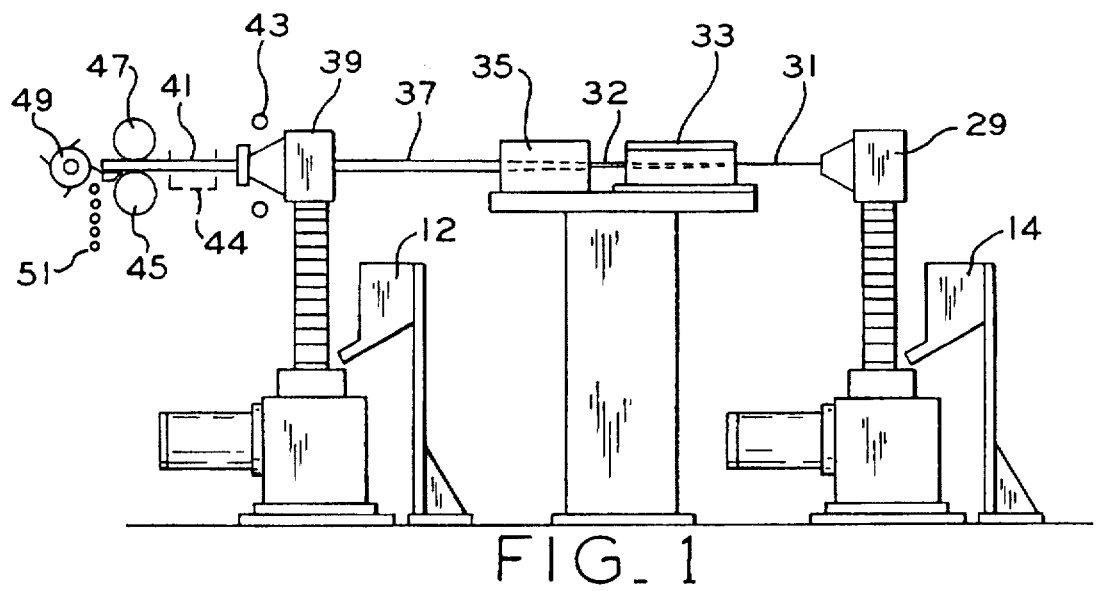
FIG_1
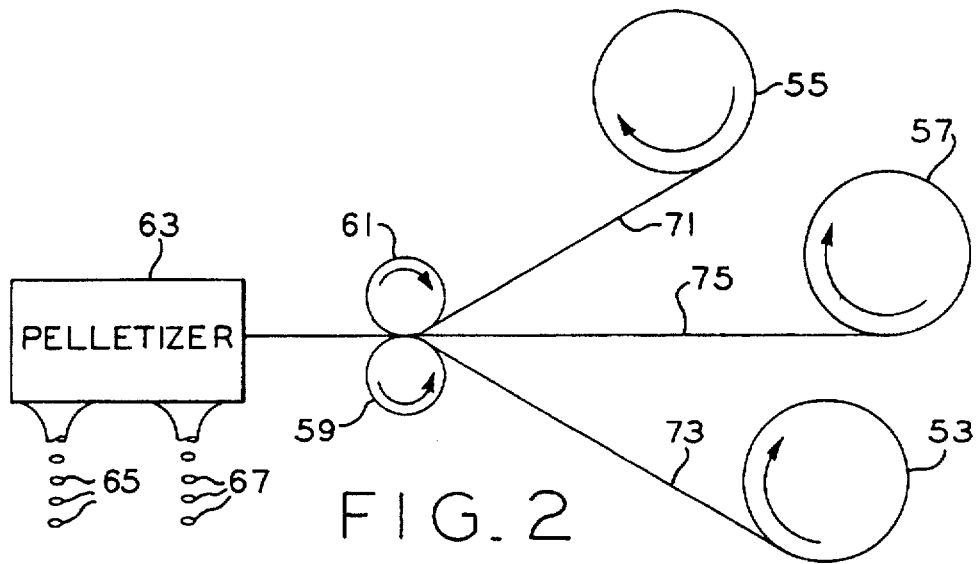
FIG_2
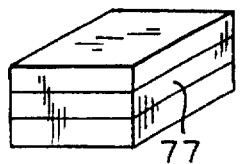
FIG_3
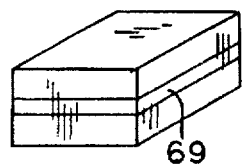
FIG_4
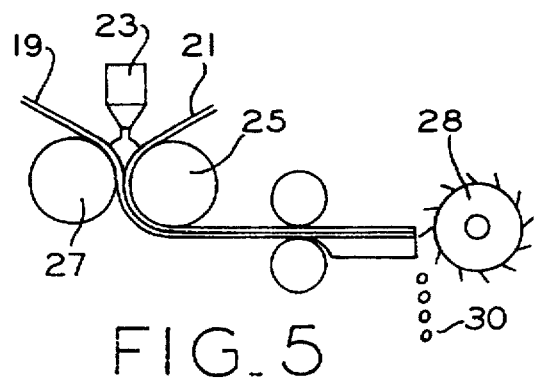
FIG_5

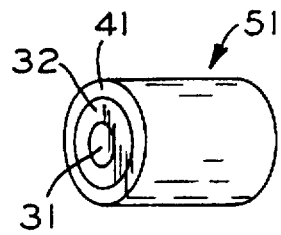
FIG_6
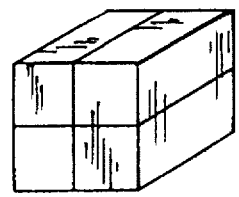
FIG_7
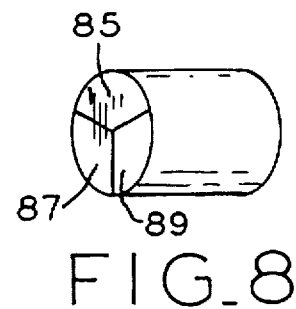
FIG_8
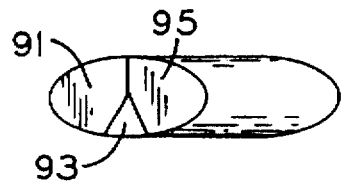
FIG_9
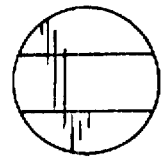
FIG_10
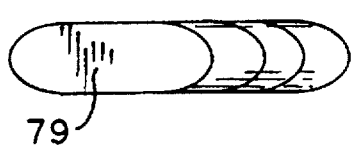
FIG_11
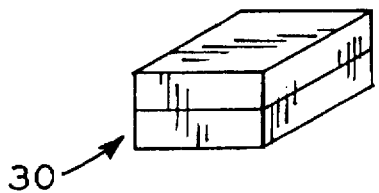
FIG_12
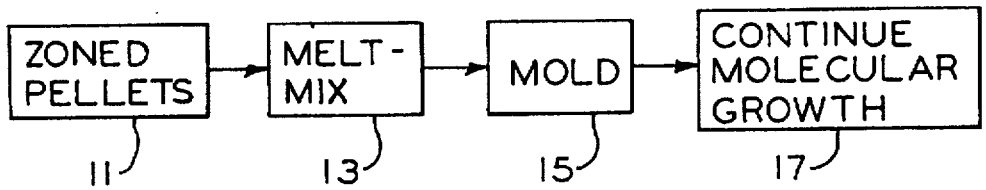
FIG_13

5,747,548

COMPARTMENTED THERMOPLASTIC PELLETS

CROSS-REFERENCE TO RELATED APPLICATION

This application is a division of application Ser. No. 08/406,582 filed Mar. 20, 1995 U.S. Pat. No. 5,627,218.

SUMMARY OF THE INVENTION

The present invention relates generally to the manufacture of hopper feedable plastic molding pellets as used, for example, as the input material for injection molding and extrusion machines, and more particularly to the manufacture of such pellets which contain physically separated reactants for subsequent melt-mixing and molding or extrusion at which time the reactants commence a chemical reaction to, for example, increase molecular size and reactively enhance physical or other properties of the molded product. A salient goal of the present invention is the production of pellets containing reactants which react during or shortly after the time of molding.

Hopper feeding of pelletized plastic to injection molding machines is commonplace. A unique use for such pellets is disclosed in my copending application Ser. No. 08/333,503 entitled WELD LINE SUPPRESSION filed Nov. 2, 1994. Moldable, air conveyable and feedable pellets containing very long fibers for forming stronger fiber reinforced parts, which up to now have been unavailable, are disclosed in my copending application Ser. No. 08/333,504 entitled FOLDED FIBER FILLED MOLDING MATERIAL filed Nov. 2, 1994. The entire disclosures of each of my copending applications are specifically incorporated herein by reference. The second copending application teaches how to overcome some of the problems in providing inert very long fibers for subsequent molding operations. While the last-mentioned application and the present invention share the concept of introducing components into hopper feedable plastic pellets, the present invention is concerned with the introduction of components which will participate in a subsequent chemical reaction at or shortly after the molding, extruding or other utilization of the pellets rather than with inert reinforcing materials.

Reactions giving plastic molding compositions added desirable properties may be carried out during melt-mixing of reactable ingredients in what is commonly called reactive extrusion compounding. Such reactions must be carried to completion so that the products can be standardized and macromolecular growth limited to prevent the product from becoming too stiff to mold. By contrast, the present invention utilizes the slowness of reactions to permit easy mold fill before the reaction converts easy flow materials into less easy flow materials.

Mixtures of randomly shaped interactive granular materials have long been used for thermosetting materials such as phenolic molding materials. Thermoplastic molding pellets have also been coated by tumbling with dry powders such as colorants or various additives such as molybdenum disulfide. In contradistinction, the pellets of the present invention each contain metered amounts of interreactive components in uniform zones or storage units, and in forms that do not rub off or separate to contaminate storage units, conveying devices or feed hoppers. Preferably, interreactive materials are contained internally within pellets in contrast to mere coatings or simple dry blends.

Many desirable compounding modifiers decrease mold fill flowability. Reaction rates involved with large molecules of moldable plastics are almost universally slow. It would be highly desirable to provide a way to maintain reactants separated until melt-mixing just before mold filling to avoid the decreased flow problem and enable good mold fill.

Among the several objects of the present invention may be noted the provision of air-conveyable, hopper feedable molding pellets containing chemical reactants; the provision of materials and techniques which enable low viscosity thermoplastic materials to be molded and thereafter crosslinked further to give desirable properties which would be unmoldable if precompounded to the same degree; the provision of materials and techniques in accordance with the previous object which reduce or eliminate the stresses formed in traditional molding of larger molecules; the provision of a technique for supplying reactive ingredients in precise separate portions within individual molding pellets so that chemical reactions and compounding advantages take place during and/or subsequent to shape molding or extrusion; and overall improvements in the formation of air-conveyable, hopper feedable plastic pellets. These as well as other objects and advantageous features of the present invention will be in part apparent and in part pointed out hereinafter.

In general, my heat softenable, hopper feedable plastic molding pellets contain one or more chemical reactants heterogeneously disposed in the pellet. These chemical reactants react or combine when melted and mixed. A thermoplastic material is formed into pellets composed of reproducible separated zones or compartments each of which may contain one or more of the reactive components. The zones may be created by laminating webs of differing components or by coextrusion of components into a composite web or strand which is thereafter diced into multilayered pellets. Differing moldable compositions may be coextruded into sectored zones, or may be sequentially extruded into multi-zoned strands having concentric reactant layers. A tube may be formed with generally parallel elongated compartments, those compartments filled with reactive paste or liquid compositions and the ends pinched to seal the compartments. The tube may then be cut into pellet segments with each cut forming opposed heat sealed ends. Within any given compartment of a pellet, it is not always necessary that all reactants be completely dissolved within its matrix or thermoplastic carrier although this is preferred in most cases.

Upon melt-mixing, the interreactions of the contained materials begins. The reaction times of the pellet contained reactants is generally long in comparison to the time required for the molding or extrusion process. The resulting increase of molecular size and linkage complexity enhances physical properties and largely takes place after the material is formed into final shape. Postmolding cure can be allowed to take place slowly or an oven cure can be effected at any time.

Also in general and in one form of the invention, a process of molding relatively large molecule containing plastic products includes melting a plurality of dissimilar, chemically reactive, relatively small molecule plastic materials and mixing those melted materials just prior to molding the mixed melted dissimilar materials into a plastic product. After molding, a crosslinking or other linkage caused chemical reaction proceeds within the molded product to create longer chain molecules within the product. Molding is performed rapidly before significant crosslinking or chain length growth of the mixed materials occurs.

Still further in general and in one form of the invention, a plurality of reproducibly zoned and structured thermoplastic molding pellets, each containing substantially the same percentage of the same chemical reactants are created by combining at least two dissimilar, easy flowing thermoplastic moldable materials into an aggregated continuous form, and reducing the continuous form into identically shaped and structured individual pellets. The dissimilar materials are typically isolated from one another within separate zones within each pellet. Certain of the zones may contain chemically inert fibrous reinforcing material or chemical foaming agents if desired. The materials are desirably chemically interreactive when mixed in the presence of heat.

BRIEF DESCRIPTION OF THE DRAWING

FIG. 1 is a diagram of apparatus for producing generally cylindrical, zoned molding pellets with dissimilar materials in coaxial annular cylindrical regions;

FIG. 2 is a diagram of apparatus for producing molding pellets which may be generally box or pillow shaped with reactants disposed in a plurality of generally flat parallel layers;

FIGS. 3 and 4 are perspective views of illustrative molding pellet configurations which may be formed by the apparatus of FIG. 2;

FIG. 5 is a view of an apparatus illustrating a variation to that of FIG. 2;

FIG. 6 is a perspective view of a molding pellet formed as in FIG. 1;

FIGS. 7–9 are perspective views of illustrative types of plastic molding pellets which may be made by coextrusion or by combining stands of heat softenable materials by use of a draw die and generally taking the form of elongated tubes having a plurality of elongated isolated compartments therein;

FIG. 10 is a perspective view of a spherical zoned plastic molding pellet;

FIG. 11 is a perspective view of a pillow-shaped molding pellet;

FIG. 12 is a perspective view of a pellet formed by the apparatus of FIG. 5; and FIG. 13 is a schematic illustration of a process advantageously utilizing the zoned pellets of the present invention.

Corresponding reference characters indicate corresponding parts throughout the several views of the drawing. Certain features shown in some of the views are readily adaptable to apparatus views in which those features do not appear.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

In FIG. 1, a first extruder 29 extrudes a core strand 31 of, for example, 3/32 of an inch diameter of almost any easily melted injection moldable material such as polyethylene supplied from hopper 14. A liquid dispersion of a foaming agent 32 is applied to the strand 37 in coater 33. This coat cools the hot strand which is subsequently dried at 35. The dried coated strand 37 is then passed through an extruder supplied crosshead tubing die 39 that extrudes a thin-walled, e.g., 1/16th inch thick, approximately one inch diameter tube 41 about the coated strand 37. Tube 41 may be of the same polyethylene as the strand core 31 and is supplied to the extruder 39 from hopper 12. The coaxial strand and tube pass through the moist air cooling ring 43 which cools the tube 41. Further cooling may be provided in a cooling trough 44 if desired. Pulling rolls 45 and 47 rapidly pull the tube, downsizing it about the strand 37 without appreciably heating the foamable coating 32. Pelletizer 49 then chops the strand surrounded tube into pellets 51. An exemplary pellet made by this technique is shown in FIG. 6 with the strand core 31 surrounded by foaming agent 32 and the outer polyethylene coating 41. Of course, additional stages to provide additional layers of coaxial annular cylindrical regions providing other reactants are possible. Also, electrostatically held powder can be used in place of fluid carried foaming agents if the strand 31 is cooled below the activation threshold of the foaming agent.

Referring to FIG. 2, elongated webs 71 and 73 of polyethylene are fed from rolls 55 and 53 while roll 57 supplies an adhesive foaming agent containing web 75. The three webs are squeezed together by pinch rollers 59 and 61 thus combining the dissimilar, easy flowing thermoplastic moldable materials into an aggregated continuous form of generally flat parallel layers. The thus laminated flat web of dissimilar moldable materials is diced at 63 forming pellets 65 and 67. The dicing of the stack reduces the aggregated continuous form into a plurality of identically shaped and structured individual cubic or pillow-shaped pellets 65 and 67. This plurality of generally similar heat softenable, hopper feedable thermoplastic molding pellets 65 and 67 may each contain one or more chemical reactants which are thermally activated to participate in a chemical reaction upon utilization of the pellets in a molding operation. Moreover, each pellet contains substantially the same percentage of the same chemical reactant. Illustrative pellets made in this way with reactants disposed in a plurality of generally flat parallel layers are shown in FIGS. 3 and 4. When such pellets are melt-mixed, a chemical reaction forms a gas which is uniformly intermingled with the matrix forming the molded shape.

For further example, a zoned pellet such as shown in FIG. 3 or FIG. 4 may have the central layer composed of an easy flowing grade of commodity injection molding quality polystyrene while the surrounding layer is composed of polystyrene of equivalent fluidity when melted, but which has not been chain terminated. The inner layer which has been chain terminated and is unreactive contains a solid addition polymer catalyst such as benzoyl peroxide dissolved in it. When such pellets are melt-mixed, the unterminated polystyrene molecular weight increases with related improvements in various physical properties.

The apparatus of FIG. 5 represents a variation on that of FIG. 2 which may be used to produce pellets such as shown in FIG. 12. Two webs 19 and 21 receive a reactant containing adhesive from dispenser 23 and are laminated together by squeezing between rollers 25 and 27. The laminated web is diced into individual pellets 30 by pelletizing wheel 28. Pellet 20 is in the form of a rectangular parallelepiped, but may more easily be described as generally cubic in shape, as may be the pellets of FIGS. 3, 4 and 7.

Many apparatus variations are possible. For example, to form shaped pellets such as the spherical pellet of FIG. 10, a pair of pocketed synchronized rolls similar to those used to compact pills and the like may be used to hot emboss and pinch-separate individual pellets of almost any shape. For longer life of such pocketed rolls when used to form fiberglass reinforced pellets, it is preferable to almost separate the pellets in the hot shaping step and follow with a break-apart step, because with soft matrices, the fibers tend to form a dense strip which is more erosive to cutting edges.

According to the teachings in my copending FOLDED FIBER FILLED MOLDING MATERIAL, any of the layers within the pellet may be provided with elongated reinforcing fibers. The length of these fibers may exceed the largest linear dimension of the pellet. The teachings of this copending application are applicable to any of the pellets discussed herein, but the somewhat elongated pillow-shaped pellet of FIG. 11 is particularly well suited to the inclusion of this feature. While most of the illustrated pellets will typically have a diameter or side of ⅛ to ¼ of an inch, the pillow shaped pellet of FIG. 11 will typically be longer to more readily accommodate the fibers. Of course, many of the other configurations may similarly be increased in length to accept very long fibers. Such fibers are illustrated at 77 in FIG. 3 and 79 in FIG. 11.

Referring now to FIG. 13, foamable thermoplastic pellets from a source 11 to a hopper and from there are supplied to a reciproscrew or similar injection molding machine typically having a hydraulic or otherwise powered forcing cylinder and heated barrel where the zoned pellets are melt-mixed as indicated generally at 13. When a valve is opened, a measured quantity of pressurized, melt-softened, premixed foam material is introduced into the cavity of a mold 15. The arrangement of FIG. 13 facilitates the molding of relatively large molecule containing plastic products. Dissimilar relatively small molecule plastic materials contained in the pellets fed from source 11 are mixed and melted, for example, in the heated barrel as indicated at 13 and then molded into a plastic product in the cavity 15. In the cavity 15, a crosslinking chemical reaction takes place in the molded product which reaction continues after molding as illustrated at 17 to create a larger molecule within the molded product. While this reaction may commence in the injection molding machine when pellet mixing begins, or in the barrel, molding into the part in cavity 15 takes place rapidly before sufficient crosslinking of the mixed materials occurs to reduce moldability of the melt. Of course, according to present day custom and equipment, it is desirable that the material remain sufficiently flowable after the reaction so that it may be purged from the extruding or other equipment even though it may be too stiff to flow into an intricate mold.

When pellets are fed into a melt-mixing injection molding machine, the foaming agent, e.g., layer 32 of FIG. 6 or layer 69 of FIG. 4, reactively decomposes and the released gas (usually nitrogen or carbon dioxide) is mixed with the plastic polyethylene of layers 31 and 41 to form a foamed plastic part. When the mold halves are clamped together, a valve is opened and the mixed and foam filled material is forced into mold 15 which may be cooled by coolant circulated through both mold halves as by a pump. After a brief pause to allow the plastic filling to develop a hardened crust, the cylinder within the injection cylinder withdraws the screw ram and forms a foam carcass inside the hardened crust. After further cooling, the mold clamping cylinder is withdrawn and the part removed. Alternately, the cylinder may be partially withdrawn a controlled amount to allow foam formation within the part. The manner of utilization of the molding arrangement of FIG. 13 with other different chemical reactants heterogeneously disposed in the pellets where the chemical reactants combine when mixed at an elevated temperature should now be apparent.

While The apparatus of FIG. 1 formed a central strand and concentric layers of dissimilar materials about the central strand allowing the formation of pellets with two different chemical reactants heterogeneously disposed in the pellets and isolated from one another within the pellet, some reactants need not be isolated so long as they remain near room temperature. That is, if the materials are only chemically interactive when heated, isolation may not be necessary. The inner and outer layers of the generally cylindrical pellet of FIG. 6 are isolated while the materials comprising the cylindrical pellets of FIGS. 8 and 9 are not isolated. The upper and lower layers of the spherical pellet of FIG. 10 are isolated from one another, as are the upper and lower layers of the generally cubical pellets of FIGS. 4 and 5.

As noted earlier, a draw die or extruder may be utilized to produce pellets generally cylindrical in shape with reactants disposed in generally pie shaped columnar chambers 85, 87 and 89 as shown in FIG. 8 or 91, 93 and 95 of FIG. 9. The chambers extend generally parallel to the cylindrical axis in FIG. 8 and may be formed by three separate extruding means which force separate materials out a common nozzle. The generally cubical pellet of FIG. 7 may be made in a similar way.

For example, while three zones are shown in FIGS. 8 and 9, other numbers of zones are easily achieved. A two zoned pellet, such as shown in FIG. 12, may have one zone containing an unsaturated polyester resin dissolved in polystyrene that has not been chain terminated. The other zone may contain a polymer catalyst, such as 1–5% benzol peroxide dissolved in polystyrene which has been chain terminated. When this material is melt-mixed and immediately injection molded, the polyester crosslinks with the unterminated polystyrene and gives molded products with enhanced properties depending upon the polyester used. Typically 5–15% polyester resin content is adequate. Higher amounts may become thermosetting.

As another example, a specialty phenolic resin may be caused to form a lattice within an injection grade of polyethylene commodity molding compound giving unusual results. One zone of a two zoned strand of polyethylene contains a substituted phenol such as nonyl phenol which is soluble in polyethylene. The other zone contains a nonvolatile, polyethylene-soluble aldehyde. The resulting phenolic lattice provided rigidity, dimensional stability and improved tensile strength.

By providing molding pellets each containing a metered amount of chemically modifying material within a compartmented and chemically isolating matrix having a low melt viscosity, it becomes possible to enhance ease of mold filling and extend the degree of crosslinking or other desired chemical reaction. The compartmented formulations may be selected to provide sufficiently slow rates of reaction that these pellets may be melt-mixed and molded into final desired shapes before the reactants cause the melt viscosity to increase sufficiently to make molding difficult. By carrying molecular growth and/or crosslinking further and extending such time of growth even beyond the molding of the melt into shapes, flow stresses and warpage are minimized and the shapes made more resistant to dimensional changes. Such larger molecules develop higher softening temperatures and, in some cases, can approach the properties of thermosetting materials.

The forgoing examples illustrate how my invention enables preparation, conveyance and use of compartmented pellets without detailing the great number of reactions which may be beneficially accommodated by their use. The final compounding of macromolecular thermoplastic molding materials can best be accomplished in the final shape forming operation regardless of which chemical reaction is involved. The slow reaction kinetics of macromolecular materials provides a time interval which can be advantageously employed to permit mold fill of temporarily easy flow plastic materials which, once activated, develop numerous enhanced desirable properties. Also, pellets according to my invention may include suitable non-chemically reactive additives such as colors, lubricants and the like.

Recyclability of the resultant thermoplastic higher polymers is easily accomplished by melt inclusion of such in lower polymer matrices.

From the foregoing, it is now apparent that a novel technique for producing commingled chemical reactants for later reaction such as heat softenable, hopper feedable plastic pellets with different reactant zones within each pellet has been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. A process for manufacturing reproducibily zoned and structured thermoplastic molding pellets comprising the steps of combining at least two dissimilar chemically interreactive, easy flowing thermoplastic moldable materials into an aggregated continuous form, and reducing the continuous form into identically shaped and structured individual pellets with the dissimilar materials isolated from one another within separate zones in the individual pellets.

2. The process of claim 1 wherein the step of combining comprises providing a central strand and forming concentric layers of dissimilar materials about the central strand.

3. The process of claim 1 wherein certain zones contain chemically inert fibrous reinforcing material.

4. The process of claim 1 wherein certain zones contain foaming agents.

5. The process of claim 1 wherein at least two of the materials are chemically interreactive when mixed and heated.

6. The process of claim 1 wherein the step of combining comprises stacking together a plurality of relatively flat sheets of dissimilar moldable materials, and the step of reducing includes dicing the stack into individual generally cubic pellets.

7. The process of claim 1 wherein the step of combining comprises providing an elongated tube having a plurality of elongated isolated compartments therein and separating at least two interactive materials by placing each in a separate compartment, and the step of reducing includes severing the tube into relatively short segments and pinch sealing the resulting tube segment ends.

8. The process of molding relatively high large molecular weight containing plastic products comprising the steps of:
melting a plurality of dissimilar chemically interreactive relatively low molecular weight plastic materials located in distinct zones within the molding pellets;
mixing the melted dissimilar materials;
quickly molding the mixed melted dissimilar materials into a plastic product;
allowing a molecular growth chemical reaction within the molded product to continue after molding to create a long-chain molecule within the molded product.

9. The process of claim 8 wherein the step of molding is performed before significant molecular growth of the mixed materials occurs.

10. The process of claim 8 wherein the step of quickly molding is performed by extrusion.

* * * * *